(12) United States Patent
Beaujot et al.

(10) Patent No.: US 10,779,459 B2
(45) Date of Patent: Sep. 22, 2020

(54) RESIDUE MANAGEMENT TOOL FOR SEEDERS

(71) Applicant: ONE PASS IMPLEMENTS INC., Langbank (CA)

(72) Inventors: Patrick M. Beaujot, Kipling (CA); Brian F. Dean, Langbank (CA); Barry K. Melanson, Kennedy (CA); Kurtis M. Fafard, Broadview (CA)

(73) Assignee: ONE PASS IMPLEMENTS INC., Langbank (CA)

( * ) Notice: Subject to any disclaimer, the term of this patent is extended or adjusted under 35 U.S.C. 154(b) by 307 days.

(21) Appl. No.: 15/754,992

(22) PCT Filed: Aug. 25, 2016

(86) PCT No.: PCT/CA2016/051003
§ 371 (c)(1),
(2) Date: Feb. 26, 2018

(87) PCT Pub. No.: WO2017/031590
PCT Pub. Date: Mar. 2, 2017

(65) Prior Publication Data
US 2018/0242512 A1    Aug. 30, 2018

Related U.S. Application Data

(60) Provisional application No. 62/210,241, filed on Aug. 26, 2015.

(51) Int. Cl.
*A01C 5/06* (2006.01)
*A01C 7/20* (2006.01)
*A01C 7/00* (2006.01)

(52) U.S. Cl.
CPC ........... *A01C 5/064* (2013.01); *A01C 5/06* (2013.01); *A01C 7/006* (2013.01); *A01C 7/203* (2013.01); *A01C 7/205* (2013.01); *Y02P 60/23* (2015.11)

(58) Field of Classification Search
CPC ......... A01C 5/062; A01C 5/064; A01C 7/203; A01C 7/205
See application file for complete search history.

(56) References Cited

U.S. PATENT DOCUMENTS

| 3,131,657 A * | 5/1964 | Morris ............... A01C 7/203 111/59 |
| 6,102,132 A * | 8/2000 | Schimke ............ A01B 15/18 111/139 |

(Continued)

FOREIGN PATENT DOCUMENTS

| CA | 2144565 A1 | 9/1995 |
| CA | 2615310 A1 | 6/2009 |

(Continued)

*Primary Examiner* — Alicia Torres
(74) *Attorney, Agent, or Firm* — Bennett Jones LLP

(57) ABSTRACT

A residue management tool mountable to a frame of a seeder for cutting or clearing residue on the ground is provided, comprising a pivotable arm having a proximal end and a distal end, the proximal end of the pivotable arm adapted to be directly or indirectly pivotally attached to the frame; a rotatable cutting or clearing device operably mounted to the distal end of the pivotable arm and operative to cut or clear the residue on the ground; a biasing device operative to exert a downward bias force on the pivotable arm to engage the rotatable cutting or clearing device with the ground; and a depth restraint operative to prevent the rotatable cutting or clearing device from over-penetrating the ground.

14 Claims, 8 Drawing Sheets

(56) References Cited

U.S. PATENT DOCUMENTS

2012/0132116 A1* 5/2012 Beaujot .................. A01C 7/203
                                                              111/163
2015/0181799 A1* 7/2015 Beaujot .................. A01C 7/205
                                                              111/151

FOREIGN PATENT DOCUMENTS

| CA | 2673265 | A1 | 10/2010 |
| CA | 2721596 | A1 | 5/2012 |
| CA | 2878488 | A1 | 1/2014 |

* cited by examiner

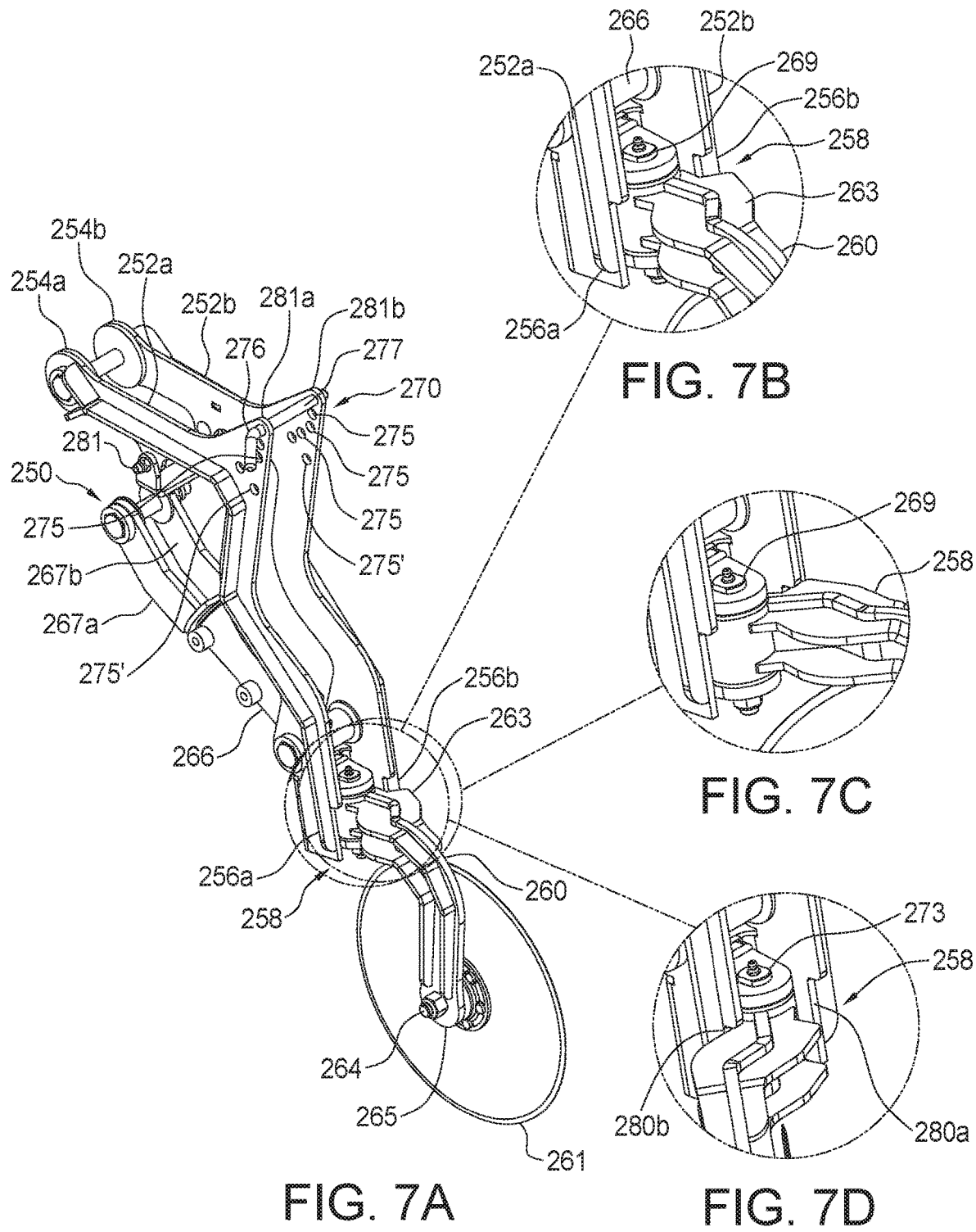

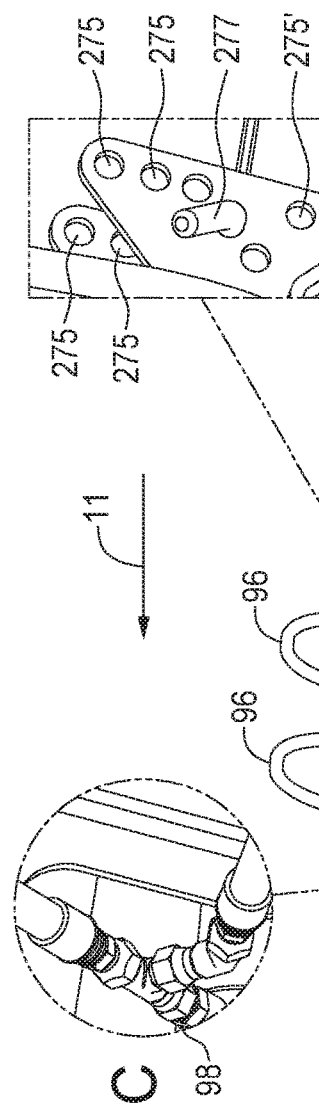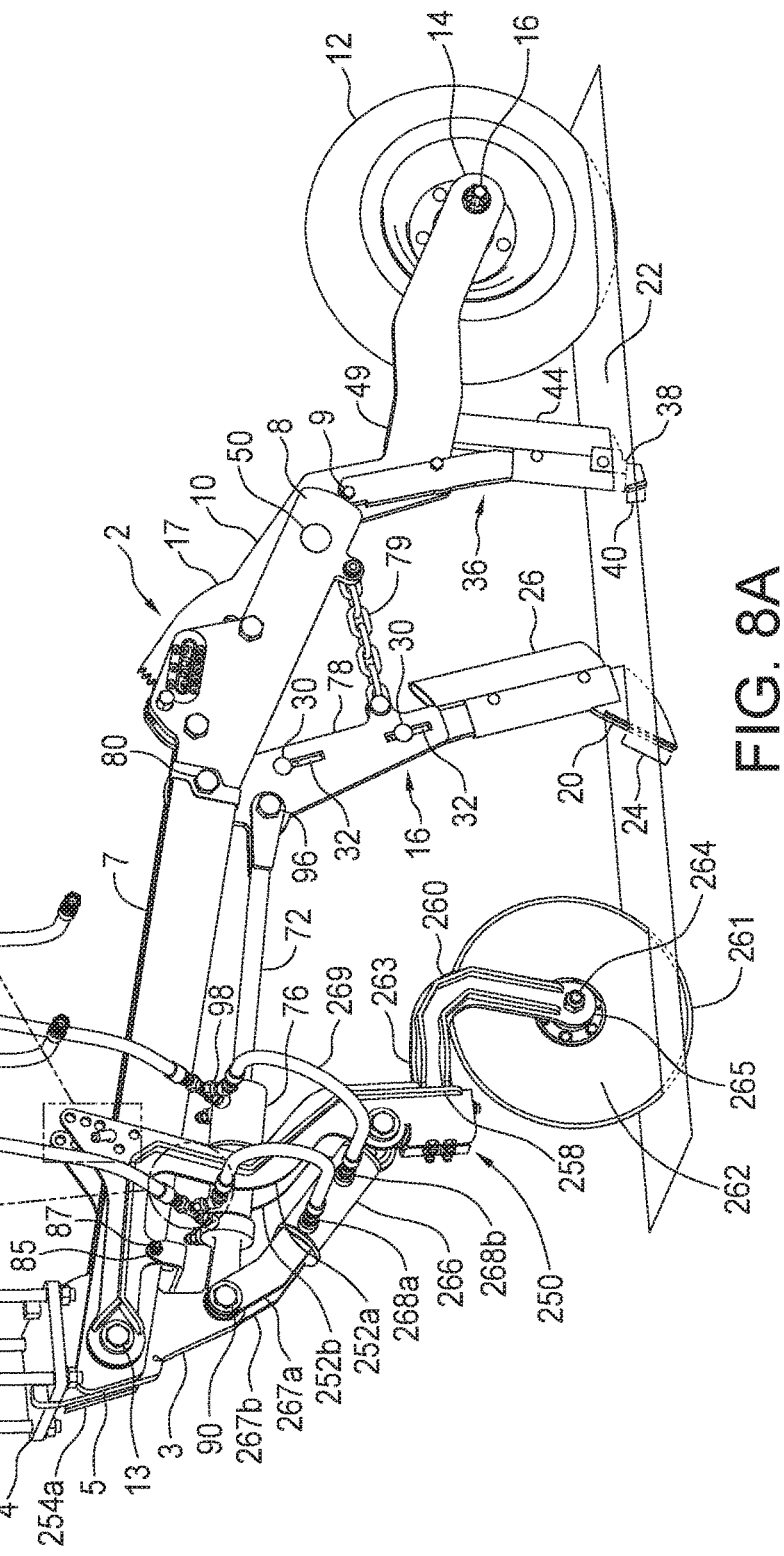

RESIDUE MANAGEMENT TOOL FOR SEEDERS

The present invention relates to a residue management tool for a seeder useful in no-till farming.

BACKGROUND OF THE INVENTION

No-till farming (also called zero tillage or direct drilling) or cover crop farming is a way of growing crops from year to year without disturbing the soil through tillage. No-till is an agricultural technique which increases the amount of water that infiltrates into the soil and increases organic matter retention and cycling of nutrients in the soil. In many agricultural regions it can reduce or eliminate soil erosion. No-till seeding requires seeding into the previous year's crop residue and/or cover crops, which presents a number of challenges to no-till farmers.

Knife openers have become more popular than disc openers in no-till farming for several reasons. One reason is that, when using a disc to open the soil for the seed, the disc often pushes straw into the furrow where the seed is placed instead of cutting it. This is commonly referred to in the industry as "hair-pinning". Hair-pinning is common when using disc openers because the disc needs to be set to seed shallow. However, the disc needs to be set relatively deep to cut straw instead of hair-pinning it.

Another reason why knives have become popular in no-till farming is that the knives also aerate and warm the soil by leaving a black strip for the seed to germinate in. Knives also leave a small furrow for the seed to grow in, and, therefore, the furrow protects the seedling and stays moist longer than the small groove left by a disc opener. Nevertheless, the use of knife openers in no-till farming may still be problematic when the residue is damp, or has long vines, etc. In these conditions, the knives will rake the straw up and sometimes plug the machine, thereby making seeding with knife openers more difficult.

Thus, there is still a need in the industry for a residue management tool for use in no-till farming, in particular, for use with knife openers.

SUMMARY OF THE INVENTION

In a first aspect, a residue management tool mountable to a frame of a seeder for cutting or clearing residue on the ground is provided, comprising:
  a pivotable arm having a proximal end and a distal end, the proximal end of the pivotable arm adapted to be directly or indirectly pivotally attached to the frame;
  a rotatable cutting or clearing device operably mounted to the distal end of the pivotable arm and operative to cut or clear the residue on the ground;
  a biasing device operative to exert a downward bias force on the pivotable arm to engage the rotatable cutting or clearing device with the ground; and
  a depth restraint operative to prevent the rotatable cutting or clearing device from over-penetrating the ground.

In one embodiment, the pivotable arm comprises a pivot arm and a mounting arm operably attached to each other at one of their ends by means of a mounting device, whereby the free end of the pivot arm attaches to the frame and the free end of the mounting arm mounts the rotatable cutting or clearing device. In one embodiment, the mounting device is adapted to allow the mounting arm to move from side to side relative to the ground.

In a second aspect, a ground opening assembly mountable to a frame of a seeder is provided, comprising:
  an elongate main member having a first end mountable to the frame and a second end;
  a first dispensing implement for dispensing a first material to a first depth in the ground mounted to the main member between the first and second ends;
  a ground compressing and gauging member mounted to the second end of the elongate main member;
  a residue management tool comprising a rotatable cutting or clearing device mountable to the frame such that it is positioned between the frame and the first dispensing implement; and
  a biasing assembly operative to exert a downward bias force on the residue management tool and the first dispensing implement to engage the ground;
  whereby the depths of both the residue management tool and the first dispensing implement in the ground are controlled by the ground compressing member.

In one embodiment, the ground opener assembly further comprises a second dispensing implement for dispensing a second material to a second depth in the ground mounted to the main member at the second end such that the second dispensing implement is positioned between the first dispensing implement and the ground compressing member. In this embodiment, the ground compressing member also controls the depth of the second dispensing implement.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein:

FIG. 7A is a perspective view of another embodiment of a residue management tool of the present invention.

FIGS. 7B, 7C, and 7D are enlarged views of the mounting device for the rotating disc assembly of the residue management tool of FIG. 7A.

FIG. 8A is a schematic side view of a ground opener assembly and a residue management tool of FIG. 7A, both operably attached to a hanging bracket of a seeder frame and in field position.

FIG. 8B is an enlargement of the depth restraint of the residue management tool of FIG. 7A.

FIG. 8C is an enlargement of the T connection for connecting hydraulic cylinders of the ground opener assembly and the residue management tool shown in FIG. 7A.

DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

There is a need in the industry for a residue management tool that may be attached to the frame of a seeder at or near the same location where each ground opener assembly is attached. The tool comprises a rotatable cutting or clearing device such as disc or row cleaner mounted on it that would either cut residue or clear the residue to the side while running in front of the ground opener assembly comprising, for example, a knife opener(s). The residue management tool should not affect the precision, packing or penetrating forces of the independent depth controlled ground opener assembly, generally controlled by a ground compressing member, and, preferably, it would still use the ground compressing member (e.g., packer wheel) for depth control to maintain the depth of the rotatable cutting or clearing device.

Preferably, the residue management tool further comprises a biasing device (e.g., a hydraulic cylinder) to provide the penetrating forces needed for cutting/clearing residue; in one embodiment, this hydraulic cylinder may run in parallel with the hydraulic cylinder of the openers. This would save considerable cost over having a complete separate hydraulic circuit for the residue device. Further, this would allow the residue management tool to also move into working position and transport position in conjunction with the opener.

Figure 1:
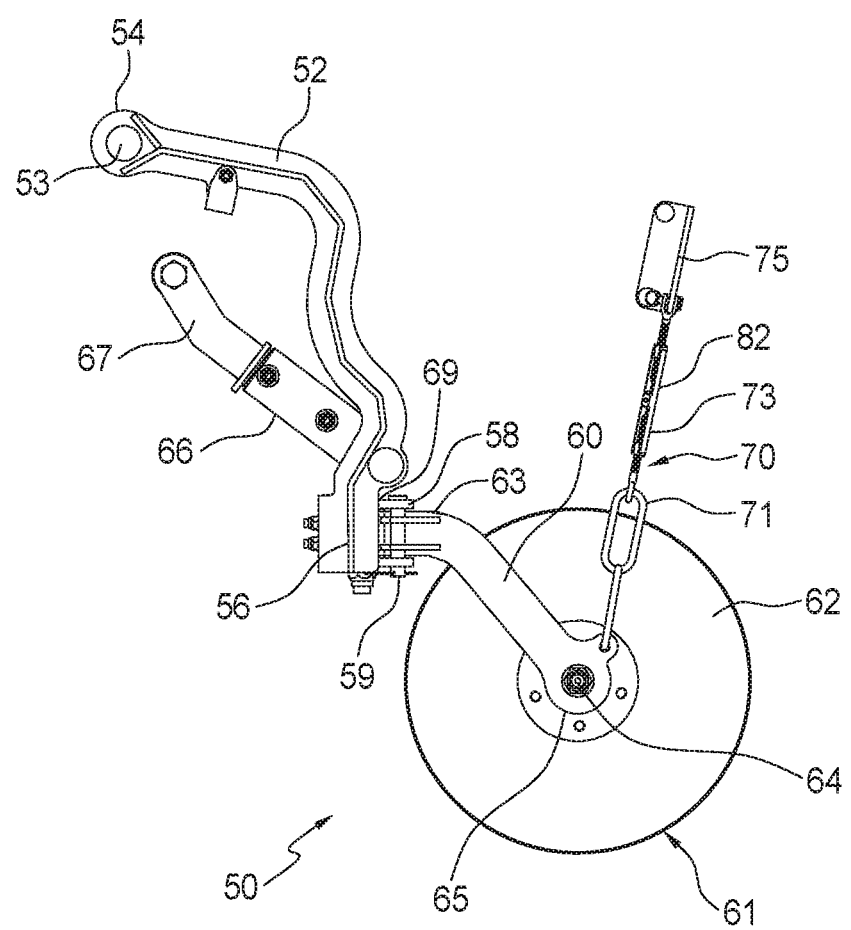
FIG. 1 is a schematic side view of one embodiment of a residue management tool of the present invention in operation on flat ground.

With reference now to FIG. 1, a side view of one embodiment of a residue management tool is shown. In this embodiment, residue management tool 50 comprises a pivot arm 52 having a proximal end 54 and a distal end 56. Proximal end 54 is adapted to be pivotally mounted directly or indirectly to the frame of a seeder at pivot point 53. In one embodiment, pivot arm 52 is pivotally attached to a hanging bracket which is attached to the frame or to the frame directly. At the distal end 56 of the pivot arm 52 is a mounting device 58 for mounting a rotatable cutting or clearing device assembly 61 for cutting and/or clearing residue to the side. Assembly 61 comprises a mounting arm 60 having a first end 63 and a second end 65. Attached to the second end 65 of mounting arm 60 via axle 64 is a rotatable cutting or clearing device, which, in the embodiment shown in FIG. 1, is a rotatable cutting disc 62. It is understood, however, that other rotatable cutting or clearing devices can also be used. For example, there may be instances where the residue may be too high to be effectively cut. Thus, a row cleaner such as a tined row cleaner can be used which moves the residue out of the row ahead of the ground openers. The first end 63 of the mounting arm 60 is attached to mounting device 58, which will be described in more detail below.

In one embodiment, pivot arm 52 and mounting arm 60 can be manufactured as an integrated unit, thereby eliminating the need for mounting device 58. In other words, a single pivotable arm can be used having a proximal end adapted to be pivotally mounted directly or indirectly to the frame of a seeder at pivot point 53 and a distal end operative to support a rotatable cutting or clearing device, generally by means of an axle.

Residue management tool 50 further comprises a biasing device, which is shown in FIG. 1 as hydraulic cylinder 66. One end of hydraulic cylinder 66 is attached to pivot arm 52 at or near the distal end 56 of pivot arm 52. The opposite end of hydraulic cylinder 66 comprises arm 67 which attaches to the frame or a hanging bracket of the frame.

Residue management tool 50 further comprises a depth restraint 70 operative to prevent the rotatable cutting disc 62 from over-penetrating the ground. In the embodiment shown in FIG. 1, depth restraint 70 is essentially a tether 82 comprising a chain 71 which is attached to the second end 65 of mounting arm 60. A turnbuckle 73 is attached to chain 71, which turnbuckle can be adjusted to hold the residue management tool up out of the ground when not need. Turnbuckle 73 can also be adjusted to regulate the depth of the rotatable cutting disc 62 in the ground. Turnbuckle 73 can be seen in more detail in FIG. 3B. Depth restraint 70 further comprises attachment plate 75, which is designed to attach the depth restraint 70 to a ground opener, as described in more detail below.

In one embodiment, the mounting device 58 for mounting the rotating disc assembly 61 of the residue management tool 50 to pivot arm 52 allows the rotating disc assembly 61 to have side to side movement by means of pivot pin 69. Pivot pin 69 allow the assembly 61 to pivot slightly when turning, thereby reducing the side forces on the disc. Also, allowing such pivoting may stop the rotatable cutting or clearing device such as rotatable cutting disc 62 from forming a trench when pulled sideways in a turn. There may be a limit stop 63 at or near the pivot point to prevent the discs from running into openers which may be present on one or both sides of the residue management tool 50. However, pivoting may be fixed by using pin 59 so that a residue management tool could be run at a slight angle to the direction on travel. This fixed position may also be desirable when seeding on a hillside, as the fixed rotatable cutting or clearing devices would keep the machine from skewing downhill on a hillside.

Thus, in operation, the residue management tool 50 is forced towards the ground by means of the hydraulic cylinder 66. In one embodiment, hydraulic cylinder 66 is connected in parallel with the ground opener hydraulics. The depth of penetration of the rotatable cutting disc 62 is controlled by the depth restraint 70, which, in the embodiment shown in FIG. 1, can be an adjustable tether 82 which is attached at one end to mounting arm 60 of the tool and attached at the other end to the ground opener (not shown) so that the disc depth is generally controlled by the opener packer wheel via the tether 82, as described in more detail below.

Figure 2:
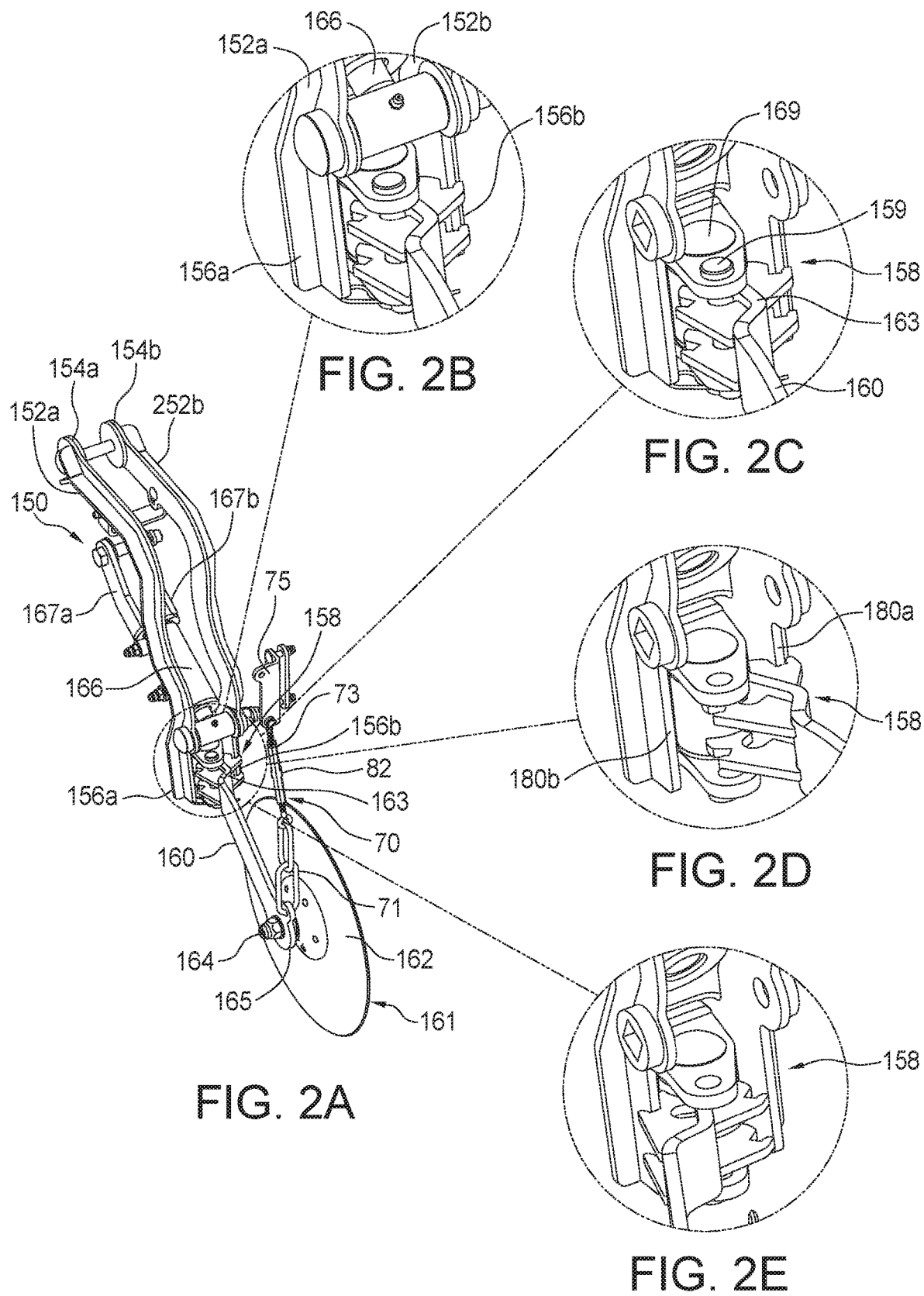
FIG. 2A is a perspective view of another embodiment of a residue management tool of the present invention.
FIGS. 2B, 2C, 2D and 2E are enlarged views of the mounting device for the rotating disc assembly of the residue management tool of FIG. 2A.

FIG. 2A is a perspective view of another embodiment of a residue management tool 150 of the present invention. In this embodiment, there are two pivot arms 152a and 152b, each having a proximal end, 154a and 154b, respectively, and a distal end, 156a and 156b, respectively. Proximal ends 154a and 154b are adapted to be pivotally mounted directly or indirectly to the frame of a seeder. The distal ends 156a and 156b are adapted to house a mounting device 158 for mounting a rotatable cutting or clearing device assembly 161 comprising a mounting arm 160 having a first end 163 and a second end 165. The first end 163 of the mounting arm 160 is attached to mounting devise 158, which attachment can be seen in more detail in perspective views in FIGS. 2B, 2C, 2D and 2E. Attached to the second end 165 of mounting arm 160 via axle 164 is a rotatable cutting or clearing device, shown in FIG. 2A to be a rotatable cutting disc 162.

Residue management tool 150 further comprises hydraulic cylinder 166 which is attached at one end near the distal ends 156a and 156b of pivot arms 152a and 152b, respectively. Cylinder 166 further comprises arms 167a and 167b for attachment of the hydraulic cylinder 166 to the frame. Attachment of hydraulic cylinder 166 to a hanging bracket of the frame is shown in more detail in FIG. 3A and is described below. FIG. 2B is a perspective view of the distal ends 156a and 156b of pivot arms 152a and 152b, respectively, and shows how the one end of the hydraulic cylinder 166 is attached to pivot arms 156a and 156b near their respective distal ends 156a and 156b.

FIG. 2C shows the details how the first end 163 of mounting arm 160 is attached to mounting device 158. In FIG. 2C, it can be seen that the first end 163 of mounting arm 160 is curved to provide a reverse L-shape configuration. The top of the reverse L-shaped portion is mounted onto the mounting device 158 by means of pivot pin 169. Pin 159 is used to hold mounting arm 160 in a fixed position and prevent the assembly 161 from pivoting. The pivot pin 169 could also be fixed so that a rotatable cutting or clearing device could be run at a slight angle to the direction of travel. This fixed position may also be desirable when seeding on a hillside, as the fixed rotatable cutting or clearing devices would keep the machine from skewing downhill on a hillside.

FIGS. 2D and 2E illustrate that pin 159 can be removed and the mounting arm 160 of rotatable cutting or clearing device assembly 161 can rotate 25 degrees to the right (FIG. 2D) or 25 degrees to the left (FIG. 2E), if required. There is a limit stop 180a and 180b on pivot arms 152a and 152, respectively, to limit the pivoting to about 25 degrees so the rotatable cutting or clearing devices don't run into openers on either side of the residue management tool. It is understood, however, that the limit stops can be designed for lesser or greater pivoting, as desired. Thus, the removal of pin 159 allows the rotatable cutting or clearing device to pivot when turning, thereby reducing the side forces on the rotatable cutting or clearing device, which would also stop it from forming a trench when pulled sideways in a turn.

Residue management tool 150 further comprises depth restraint 70 operative to prevent the rotatable cutting disc 162 from over-penetrating the ground. Depth restraint 70 is essentially the same as shown in FIG. 1, and is described in more detail below.

It is understood that pivot arms 152a and 152b and mounting arm 160 can be manufactured as an integrated unit, thereby eliminating the need for mounting device 158. In other words, a single pivotable arm can be used having a proximal end adapted to be pivotally mounted directly or indirectly to the frame of a seeder at a pivot point and a distal end operative to support a rotatable cutting or clearing device, generally by means of an axle.

Figure 3:
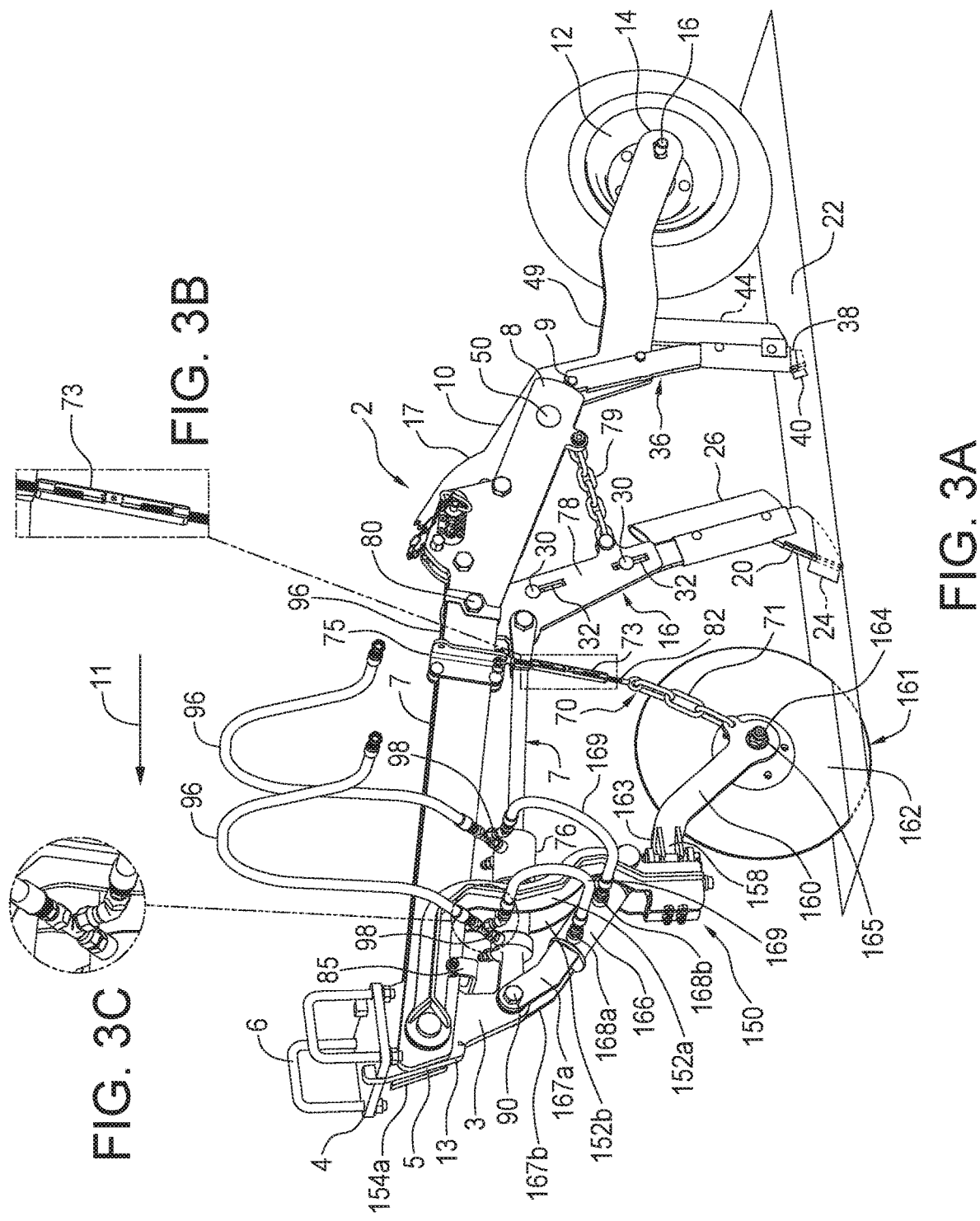
FIG. 3A is a schematic side view of a ground opener assembly and a residue management tool of FIG. 2A, both operably attached to a hanging bracket of a seeder frame and in field position.
FIG. 3B is an enlargement of a turnbuckle of a depth restraint of the residue management tool of FIGS. 1 and 2A.
FIG. 3C is an enlargement of the T connection for connecting hydraulic cylinders of the ground opener assembly and the residue management tool shown in FIG. 3A.

FIG. 3A is a perspective view of an embodiment of a ground opener assembly and a residue management tool of the present invention, both of which can be mounted to a frame. In this embodiment, both the ground opener assembly and residue management tool are mounted to the same hanging bracket as described in more detail below. In this embodiment, the ground opener assembly 2 is a dual material dispensing ground opener assembly, meaning it comprises two openers, and is shown operating in flat field conditions with both ground openers positioned in the ground 22. It is understood, however, that the residue management tool of the present invention can also be used with a ground opener assembly comprising only one opener.

At least one ground opener assembly 2 is mounted to a conventional frame (not shown) by mounting device 4 comprising clamps 6 and hanging bracket 3. Assembly 2 comprises elongate main member 7 having a proximal end 5 and a distal end 8. Proximal end 5 of main member 7 is pivotally mounted to hanging bracket 3 by means of pivot bolt 13. Thus, the frame acts to support the proximal end 5 of elongate main member 7 above the ground. The distal end 8 of main member 7 is supported by an arm 9 pivotally mounted at pivotable joint 10 to the main member 7. Arm 9 supports a ground compressing and gauging member, shown here in the form of a wheel element 12, (e.g., a packer wheel) at the second end 14 of the arm 9. Wheel element 12 is rotatably mounted to arm 9 by an axle and bearings 16 to permit free rotation of the wheel element over the ground 22. The frame is towed across a field by a tractor or other suitable vehicle to pull the at least one attached assembly 2 over the field in the direction indicated by arrow 11.

A first dispensing implement or opener 16 for dispensing a first material, such as fertilizer, to a first depth in the ground 22 is mounted to main member 7 between the proximal end 5 and the distal end 8 of main member 7. In the illustrated embodiment, the first dispensing implement 16 includes a knife 20 for forming a first furrow in the ground 22. In FIG. 3A, knife 20 is shown penetrating ground 22 to create a first furrow of depth 24. Immediately behind knife 20, there is a tube 26 for depositing a first material, in this case fertilizer, into the first furrow from a supply source (not shown). Such a supply tube is conventional. Preferably, knife 20 is mounted to the main member 7 to allow for independent adjustment of depth 24. In the illustrated embodiment, this involves knife 20 being mounted to a downwardly extending pivot bracket 78 via a pair of bolts 30 movable in slots 32 formed in the pivot bracket 78 to adjust the vertical position of the knife 20. Once the vertical position of the knife 20 is determined, bolts 30 can be tightened so that knife 20 remains in position.

A second dispensing implement or opener 36 for dispensing a second material, such as seed, to a second depth different than the first depth 24 is mounted to arm 9. In the illustrated embodiment, the second dispensing implement 36 includes a knife 38 for forming a second furrow in the ground. Knife 38 is shown penetrating ground 22 to create a second furrow of depth 40. Immediately behind knife 38, there is a tube 44 for depositing a second material, in this case seed, into the second furrow from a supply source (not shown). Such a supply tube is conventional. Preferably, knife 38 is fixedly mounted to arm 9. Vertical adjustment of knife 38 is accomplished by pivoting of arm 9 about pivotable joint 10. Alternatively, additional vertical adjustment of knife 38 may be performed by vertical movement of knife 38.

Generally, second dispensing implement 36 is mounted to arm 9 to be laterally offset from first dispensing implement 16 in order to laterally space the first and second furrows according to recommended agronomic practice. Arm 9 is preferably formed with angled section 49 after second dispensing implement 36 to position wheel element 12 over the first and second furrows in order to perform its packing function. While wheel element 12 has been shown in the drawing, a person skilled in the art will understand that alternative ground compressing members are possible such as a skid.

Main member 7 is preferably formed from a pair of elongate, spaced parallel beams. These parallel beams define an open space therebetween to receive the various components which are sandwiched between the beams. For example, the first end 17 of arm 9 may be housed between beams adjacent pivotable joint 10. A bolt 50 extending through aligned holes in the beams and arm 9 defines pivotable joint 10. The lock for pivotable joint 10 may be formed by a nut and bolt arrangement. In operation, the pivotable joint 10 is locked so that main member 7 and arm 9 function as a single unit. Thus, once the depth of the second dispensing implement 36 is set, pivotable joint 10 is locked.

It is preferable that the assembly of the present invention is provided with a biasing system 72 to exert a ground penetrating force to the first and second dispensing implements 16 and 36, respectively, and a compressing force to the wheel element 12 instead of relying on gravity. In the illustrated arrangement, the biasing system comprises an adjustable hydraulic cylinder 76. Cylinder 76 extends between hanging bracket 3 at the proximal end 5 of the main member 7 and the pivot bracket 78 extending from the main member 7. As previously mentioned, pivot bracket 78 supports knife 20 and is pivotally supported by main member 7. In some embodiments, in particular where main member 7 comprises two beams, pivot bracket 78 is pivotally supported between the beams by a pivot pin 80 extending between the beams and through the upper end of the pivot bracket 78. In this instance, the ends of the beams are pivotally mounted to hanging bracket 3 by pivot bolt 13.

At one end, hydraulic cylinder 76 is pivotally mounted at 90 to the bottom of hanging bracket 3. At the other end, hydraulic cylinder 76 is pivotally connected at 96 to pivot bracket 78. Hydraulic lines 96 connectable to cylinder ports 98 control the extension and retraction of the cylinder to maintain the biasing force. Hydraulic cylinder 76 preferably includes an adjustable overload pressure valve whereby an excess force applied to the first dispensing implement 16 will activate the valve to release the excess pressure allowing implement 16 to pivot rearwardly about pivot pin 80 with pivot bracket 78. In other words, pivot bracket 78 acts as a trip release mechanism to permit pivoting of the first dispensing member out of the way of an obstacle encountered in the ground. Further, a chain 79 extending between pivot bracket 78 and main member 7 is provided to limit the forward travel of fertilizer knife 20 and pivot bracket 78 so that excess force from the hydraulic cylinder 76 is transferred to wheel element 12.

Ground opener assembly 2 may further comprise a residue management tool of the present invention. In FIG. 3A, the residue management tool 150 is the embodiment shown in FIG. 2A, FIG. 3A shows the attachment of the residue management tool 150 to the frame and its overall interaction with ground opener assembly 2. Proximal ends 154a and 154b (not shown) of the pivot arms 152a and 152b, respectively, of residue management tool 150, are attached to hanging bracket 3 at the same pivot point as that which is used to attach the main member 7 of ground opener assembly 2 to hanging bracket 3, using an elongated pivot bolt 13, such that main member 7 is essentially sandwiched between pivot arms 152a and 152b. Hydraulic cylinder 166, which is attached at one end to pivot arms 152a and 152b, comprises arms 167a and 167b at its other end, which arms attach cylinder 166 to the frame via hanging bracket 3. In particular, arms 167a and 167b are pivotally mounted at pivot point 90, as is hydraulic cylinder 76 of opener assembly 2.

Hydraulic cylinder 166 further comprises cylinder ports 168a and 168b, each having a hydraulic line 169 connectable to cylinder ports 168a and 168b, and hydraulic lines 169 are each connected hydraulic cylinder 76 of opener assembly 2 via "T" connectors as shown in FIG. 3C. Thus, hydraulic cylinder 166 would run in parallel with the hydraulic cylinder 76 of the openers. This would save considerable cost over having a complete separate hydraulic circuit for the residue management device. Furthermore, it allows the residue management tool 150 to move into working position and transport position in conjunction with the opener.

Residue management tool 150 further comprises a rotatable cutting or clearing device assembly 161 comprising a mounting arm 160 having a first end 163 and a second end 165. First end 163 is mounted to mounting device 158 and a rotatable cutting or clearing device, such as rotatable cutting disc 162, is attached to the second end 165 of mounting arm 160 via axle 164. Residue management tool 150 further comprises depth restraint 70. As previously discussed, depth restraint 70 is essentially a tether comprising a chain 71 which is attached to the second end 165 of mounting arm 160. A turnbuckle 73 is attached to chain 71, which turnbuckle can be adjusted to hold the residue management tool up out of the ground when not need. Depth restraint 70 further comprises attachment plate 75, which attaches the depth restraint 70 to main member 7 of the opener.

Thus, when pivot arms 152a and 152b of residue management tool 150 are forced towards the ground with hydraulic cylinder 166, which cylinder is connected in parallel with the opener hydraulic cylinder 76, the depth of penetration of the rotatable cutting disc 162 is controlled by adjustable tether 70 at the distal end of the pivot arm 160 and connected to the main member 7 of the opener 2 so that the disc 162 depth is then generally controlled by the opener packer wheel 12 via the tether 70. Hence, any excess force from hydraulic cylinder 166 is also transferred to packer wheel 12.

Figure 4:
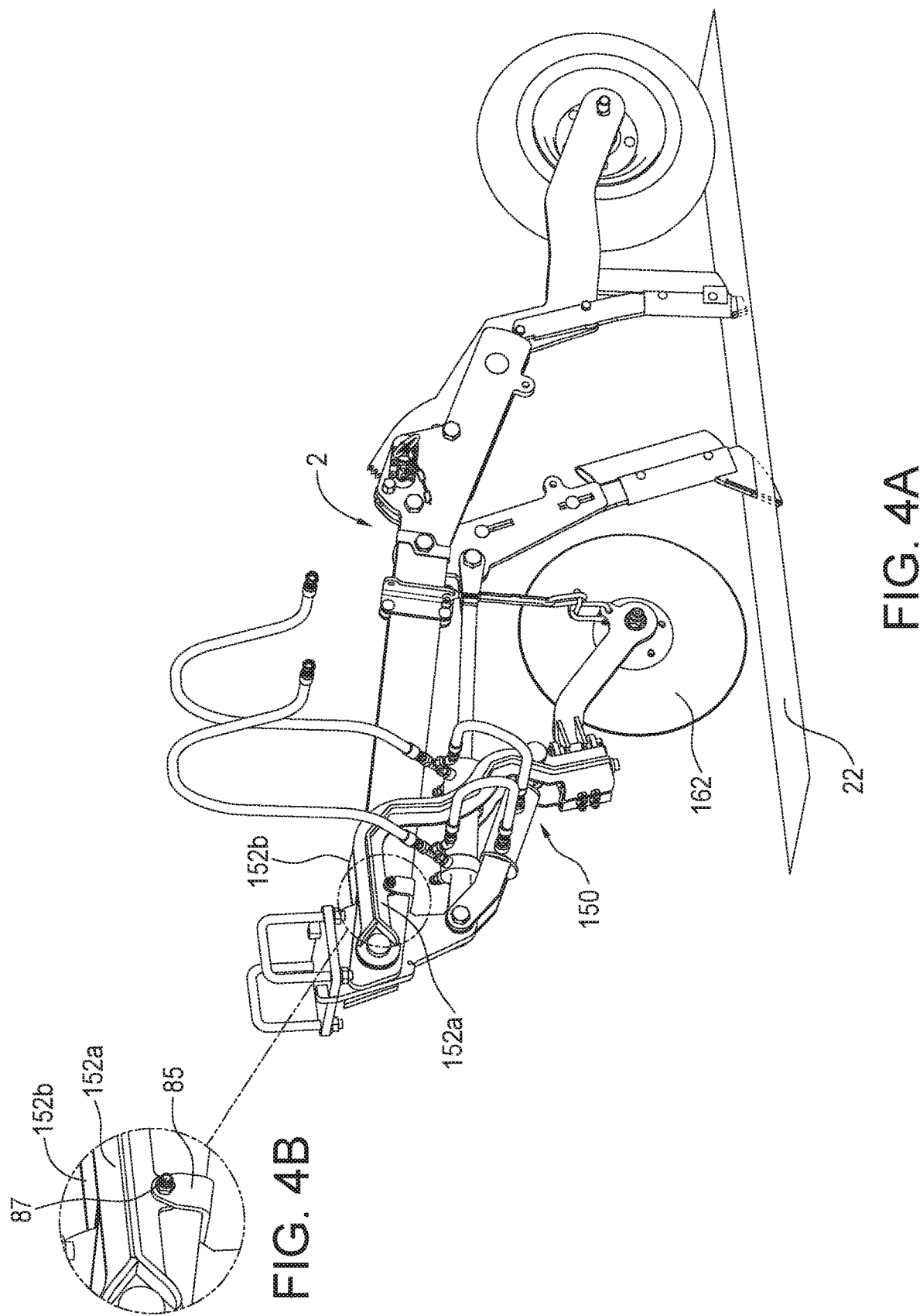
FIG. 4A is a schematic side view of the residue management tool of FIG. 3A when going into transport position.
FIG. 4B is an enlarged view of the bracket used to restrict the movement of the residue management tool of FIG. 3A when going into transport position.

In one embodiment, residue management tool 150 may further comprise bracket 85, which bracket is positioned beneath pivot arms 152a and 152b (FIGS. 4A and 4B). Bracket 85 is secured to pivot arms 152a and 152b by two bolts 87 (only one shown). Bracket 85 allows residue management tool 150 to be lifted only to a certain point, as the bracket 85 limits its upward motion (see FIGS. 4A and 5). Thus, bracket 85 contacts main member 7, allowing both the opener 2 and residue management tool to be lifted off the ground 22 together when put into transport position (FIG. 5) but still preventing the disc 162 from colliding with opener 2.

Figure 6:
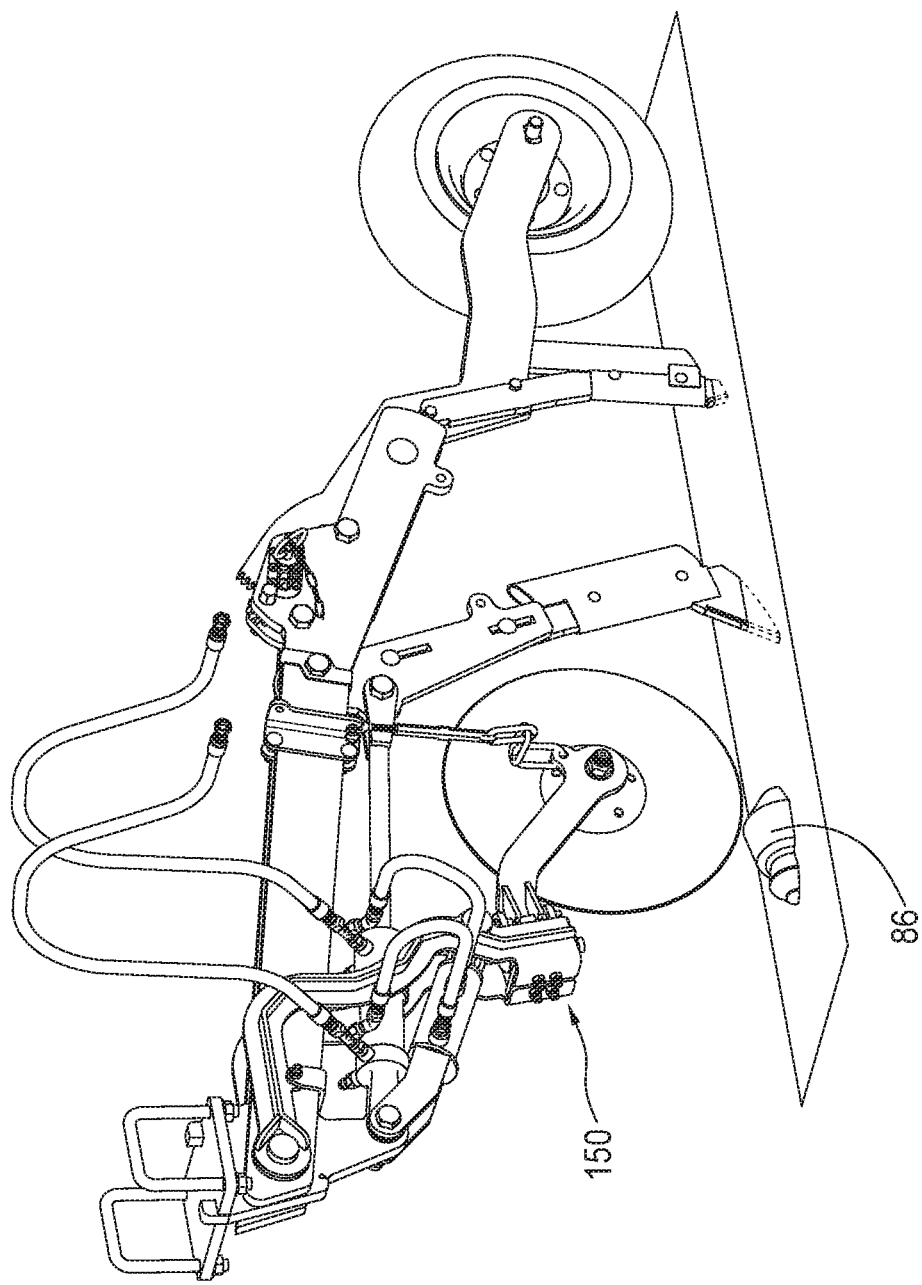
FIG. 6 shows tripping mechanism of a residue management tool of the present invention.

FIG. 6 illustrates that residue management tool 150 is designed such that it trips independently of the rest of the opener 2 when encountering an obstacle 86 in the ground. Thus, the residue management tool 150 uses the same trip system (e.g., hydraulic system) as knife 20. This adds to the efficiency of the residue management tool 150.

FIG. 7A is a perspective view of another embodiment of a residue management tool 250 of the present invention. In this embodiment, there are two pivot arms 252a and 252b, each having a proximal end, 254a and 254b, respectively; and a distal end, 256a and 256b, respectively. Proximal ends 254a and 254b are adapted to be pivotally mounted directly or indirectly to the frame of a seeder. The distal ends 256a and 256b are adapted to house a mounting device 258 for mounting a rotatable cutting or clearing device assembly 261 comprising a mounting arm 260 having a first end 263 and a second end 265. The first end 263 of the mounting arm 260 is attached to mounting devise 258, which attachment can be seen in more detail in perspective views in FIGS. 7B, 7C, 7D and 7E. Attached to the second end 265 of mounting arm 260 via axle 264 is a rotatable cutting or clearing device, shown in FIG. 7A to be a rotatable cutting disc 262.

Residue management tool 250 further comprises hydraulic cylinder 266 which is attached at one end near the distal ends 256a and 256b of pivot arms 252a and 252b, respectively, as shown in more detail in FIG. 7B. Cylinder 266 further comprises arms 267a and 267b for attachment of the hydraulic cylinder 266 directly or indirectly to the frame. Attachment of hydraulic cylinder 266 to a hanging bracket of the frame is shown in more detail in FIG. 8A. FIG. 7B is a perspective view of the distal ends 256a and 256b of pivot arms 252a and 252b, respectively, and shows how the one end of the hydraulic cylinder 266 is attached to pivot arms 256a and 256b near their respective distal ends 256a and 256b.

Residue management tool 250 further comprises depth restraint 270 operative to prevent the rotatable cutting disc 262 from over-penetrating the ground. Depth restraint 270 is shown in FIG. 7A. In this embodiment, depth restraint 270 comprises a plurality holes 275 drilled through a portion of both pivot arms 256a and 256b (shown as apex 281a and 281b), such that the holes 275 on each pivot arm line up and a locking pin 277 can be inserted therethrough. Holes 275' line up such that when locking pin 277 is inserted therethrough, the residue management tool 250 is in transport position. Locking pin 277 then rest on main member 7, which is shown in more detail in FIG. 8A.

FIG. 7C shows the details how the first end 263 of mounting arm 260 is attached to mounting device 258. In FIG. 7C, it can be seen that the first end 263 of mounting arm 160 is curved to provide side to side movement of rotatable cutting or clearing device assembly 261. First end 263 of mounting arm 260 is mounted onto the mounting device 258 by means of pivot pin 269.

FIGS. 7C and 7D illustrate that mounting arm 260 of rotatable cutting or clearing device assembly 261 can rotate 40 degrees to the right (FIG. 7E) or 40 degrees to the left (FIG. 7D), if required. There is a limit stop 280a and 280b on pivot arms 252a and 252, respectively, to limit the pivoting to about 40 degrees so that the rotatable cutting or clearing devices don't run into openers on either side of the residue management tool. It is understood, however, that the limit stops can be designed for lesser or greater pivoting, as desired. Thus, the rotatable cutting or clearing device 261 can pivot when turning, thereby reducing the side forces on the rotatable cutting or clearing device, which would also stop it from forming a trench when pulled sideways in a turn.

It is understood that pivot arms 252a and 252b and mounting arm 260 can be manufactured as an integrated unit, thereby eliminating the need for mounting device 258. In other words, a single pivotable arm can be used having a proximal end adapted to be pivotally mounted directly or indirectly to the frame of a seeder at a pivot point and a distal end operative to support a rotatable cutting or clearing device, generally by means of an axle.

FIG. 8A is a perspective view of a ground opener assembly 2 comprising first and second dispensing implements, as described above, and the residue management tool 250 shown in FIG. 7A. Ground opener assembly 2 is mounted to a conventional frame (not shown) by mounting device 4 comprising clamps 6 and hanging bracket 3 and is provided with a biasing system 72 to exert a ground penetrating force to the first and second dispensing implements 16 and 36, respectively, and a compressing force to the wheel element 12. The biasing system comprises an adjustable hydraulic cylinder 76. Cylinder 76 extends between hanging bracket 3 at the proximal end 5 of the main member 7 and the pivot bracket 78 extending from the main member 7. At one end, hydraulic cylinder 76 is pivotally mounted at 90 to the bottom of hanging bracket 3. At the other end, hydraulic cylinder 76 is pivotally connected at 96 to pivot bracket 78. Hydraulic lines 96 connectable to cylinder ports 98 control the extension and retraction of the cylinder to maintain the biasing force.

Residue management tool 250 is also attached to the frame (not shown). Proximal ends 254a and 254b (not shown) of the pivot arms 252a and 252b, respectively, of residue management tool 250, are attached to hanging bracket 3 at the same pivot point as that which is used to attach the main member 7 of ground opener assembly 2 to hanging bracket 3, using an elongated pivot bolt 13, such that main member 7 is essentially sandwiched between pivot arms 252a and 252b. Residue management tool 250 is also provided with a biasing device to exert a ground penetrating force to the tool. Biasing device of tool 250 comprises hydraulic cylinder 266, which is attached at one end to pivot arms 252a and 252b, and comprises arms 267a and 267b at its other end, which arms attach cylinder 266 to the frame via hanging bracket 3. In particular, arms 267a and 267b are pivotally mounted at pivot point 90, as is hydraulic cylinder 76 of ground opener assembly 2.

Hydraulic cylinder 266 further comprises cylinder ports 268a and 268b, each having a hydraulic line 269 connectable to cylinder ports 268a and 268b, and hydraulic lines 269 are each connected to hydraulic cylinder 76 of opener assembly 2 via "T" connectors as shown in FIG. 8C. Thus, hydraulic cylinder 266 would run in parallel with the hydraulic cylinder 76 of the openers. This would save considerable cost over having a complete separate hydraulic circuit for the residue management device. Furthermore, it allows the residue management tool 250 to move into working position and transport position in conjunction with the opener.

Residue management tool 250 further comprises a depth restraint 270, which can be seen in more detail in FIG. 8B. Depth restraint 270 comprises a plurality of holes 275 on both pivot arms 256a and 256b (shown as apex 281a and 281b), such that the holes 275 on each pivot arm line up and a locking pin 277 can be inserted therethrough. Holes 275 can be spaced, for example, at 1 inch increments, to control the depth of the rotatable cutting disc 262 in the ground. Holes 275' line up such that when locking pin 277 is inserted therethrough, the residue management tool 250 is in transport position.

Thus, when pivot arms 252a and 252b of residue management tool 250 are forced towards the ground with hydraulic cylinder 266, which cylinder is connected in parallel with the opener hydraulic cylinder 76, the depth of penetration of the rotatable cutting disc 262 is controlled by depth restraint 270 so that the disc 262 depth is then generally maintained by the opener packer wheel 12. Hence, any excess force from hydraulic cylinder 266 is also transferred to packer wheel 12.

In one embodiment, residue management tool 250 may further comprise bracket 85, which bracket is positioned beneath pivot arms 252a and 252b. Bracket 85 is secured to pivot arms 252a and 252b by two bolts 87 (only one shown).

Figure 5:
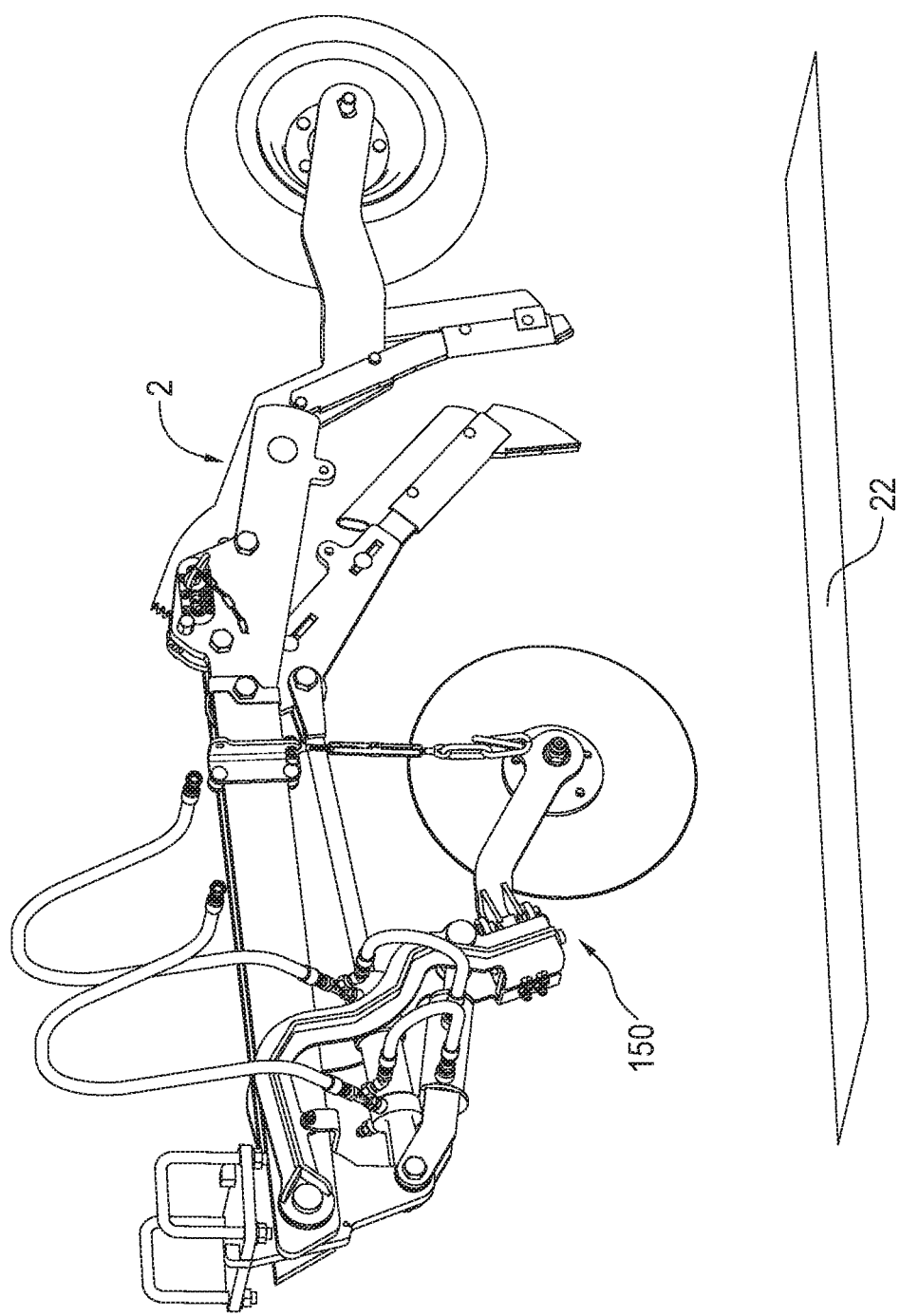
FIG. 5 is a schematic side view of the ground opener assembly and the residue management tool of FIG. 3A in the transport position.

Bracket 85 allows residue management tool 250 to be lifted only to a certain point, as the bracket 85 limits its upward motion (see FIG. 5). Thus, bracket 85 contacts main member 7, allowing both the opener 2 and residue management tool to be lifted off the ground 22 together when put into transport position but still preventing the disc 162 from colliding with opener 2.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A residue management tool mountable to a frame of a seeder for cutting or clearing residue on the ground, comprising:
   (a) a pivotable arm having a proximal end and a distal end, the proximal end of the pivotable arm adapted to be directly or indirectly pivotally mounted to the frame;
   (b) a rotatable cutting or clearing device operably mounted to the distal end of the pivotable arm and operative to cut or clear the residue on the ground;
   (c) a first biasing device operative to exert a downward bias force on the pivotable arm to engage the rotatable cutting or clearing device with the ground;
   (d) a depth restraint operative to prevent the rotatable cutting or clearing device from over-penetrating the ground;
   Wherein the pivotable arm comprises a pivot arm and a mounting arm operably attached to each other at one of their ends by means of a mounting device, whereby a free end of the pivot arm attaches to the frame and a free end of the mounting arm mounts the rotatable cutting or clearing device; and
   Wherein the mounting device is adapted to allow the mounting arm to move from side to side relative to the ground.

2. The residue management tool as claimed in claim 1, wherein the mounting arm can move about 25 to about 45 degrees side to side.

3. The residue management tool as claimed in claim 1, whereby the depth restraint comprised a tether.

4. The residue management tool as claimed in claim 1, wherein the depth restraint comprises a plurality of holes in the pivotable arm and a lock pin.

5. A ground opening assembly mountable to a frame of a seeder, comprising:
   (a) an elongate main member having a first end mountable to the frame and a second end;
   (b) a first dispensing implement for dispensing a first material to a first depth in the ground mounted to the main member between the first and second ends;
   (c) a ground compressing and gauging member mounted to the second end of the elongate main member;
   (d) a residue management tool comprising a pivotable arm having a proximal end and a distal end, the proximal end of the pivotable arm adapted to be directly or indirectly pivotally mounted to the frame; a rotatable cutting or clearing device operably mounted to the distal end of the pivotable arm and operative to cut or clear the residue on the ground; a first biasing device operative to exert a downward bias force on the pivotable arm to engage the rotatable cutting or clearing device with the ground; and a depth restraint operative to prevent the rotatable cutting or clearing device from over-penetrating the ground; mounted to the frame such that it is positioned between the frame and the first dispensing implement; and
   (e) a second biasing device operative to exert a downward bias force on the first dispensing implement to engage the ground;
whereby the depths of both the residue management tool and the first dispensing implement in the ground are controlled by the ground compressing member and any excess downward bias forces on the residue management tool and the first dispensing implement are applied to the ground compressing and gauging member.

6. The assembly as claimed in claim 5, wherein the ground opener assembly further comprises a second dispensing implement for dispensing a second material to a second depth in the ground mounted to the main member at the second end such that the second dispensing implement is positioned between the first dispensing implement and the ground compressing and gauging member.

7. The assembly as claimed in claim 6, wherein the ground compressing and gauging member also controls the depth of the second dispensing implement.

8. The assembly as claimed in claim 5, wherein the first biasing device and the second biasing device are interconnected.

9. The assembly as claimed in claim 7, whereby the first biasing device is a first hydraulic cylinder and the second biasing device is a second hydraulic cylinder and the first and second hydraulic cylinders are interconnected in parallel.

10. The assembly as claimed in claim 9, whereby hydraulic lines of the first and second hydraulic cylinders are interconnected by means of a T connector.

11. The assembly as claimed in claim 5, wherein the mounting device of the residue management tool is adapted to allow the mounting arm to move from side to side relative to the ground.

12. The assembly as claimed in claim 11, wherein the mounting arm can move about 25 to about 45 degrees side to side.

13. The assembly as claimed in claim 5, whereby the depth restraint comprised a tether.

14. The assembly as claimed in claim 5, wherein the depth restraint comprises a plurality of holes in the pivotable arm and a lock pin.

* * * * *